(12) United States Patent
Walker et al.

(10) Patent No.: US 8,271,327 B2
(45) Date of Patent: Sep. 18, 2012

(54) METHOD AND APPARATUS FOR IDENTIFYING POTENTIAL BUYERS

(75) Inventors: Jay S. Walker, Ridgefield, CT (US);
John M. Packes, Jr., Stamford, CT (US); Daniel E. Tedesco, New Canaan, CT (US); Stephen C. Tulley, Stamford, CT (US); Keith Bemer, New York, NY (US); James A. Jorasch, Stamford, CT (US)

(73) Assignee: Groupon, Inc., Chicago, IL (US)

( * ) Notice: Subject to any disclaimer, the term of this patent is extended or adjusted under 35 U.S.C. 154(b) by 1067 days.

(21) Appl. No.: 12/111,716

(22) Filed: Apr. 29, 2008

(65) Prior Publication Data

US 2008/0201232 A1    Aug. 21, 2008

Related U.S. Application Data

(63) Continuation of application No. 10/642,894, filed on Aug. 18, 2003, now abandoned, which is a continuation of application No. 09/349,860, filed on Jul. 8, 1999, now abandoned, which is a continuation-in-part of application No. 08/889,589, filed on Jul. 8, 1997, now Pat. No. 5,970,470.

(51) Int. Cl.
*G06Q 30/00* (2012.01)

(52) U.S. Cl. ............... 705/14.19; 705/14.35; 705/26.35; 705/26.8

(58) Field of Classification Search ............... 705/14.19, 705/14.35, 26.35, 26.8
See application file for complete search history.

(56) References Cited

U.S. PATENT DOCUMENTS

| | | | | |
|---|---|---|---|---|
| 3,842,348 A | * | 10/1974 | Goshy | ............................. 324/94 |
| 4,002,890 A | * | 1/1977 | Welin | ............................ 705/412 |
| 4,554,446 A | | 11/1985 | Murphy et al. | |
| 4,723,212 A | | 2/1988 | Mindrum et al. | |
| 4,752,877 A | * | 6/1988 | Roberts et al. | .............. 705/36 R |
| 4,876,592 A | | 10/1989 | Von Kohorn | |
| 4,910,672 A | | 3/1990 | Off et al. | |
| 5,025,372 A | | 6/1991 | Burton et al. | |

(Continued)

FOREIGN PATENT DOCUMENTS

WO   WO 96/05699 A1   2/1996

(Continued)

OTHER PUBLICATIONS

"Characteristics and Risks of Standardized Options", Feb. 1994 with Dec. 1997 supplement, pp. 1-50, downloaded Aug. 16, 2011 from http://www.cboe.com/LearnCenter/pdf/characteristicsandrisks.pdf.*

(Continued)

*Primary Examiner* — Donald L. Champagne
(74) *Attorney, Agent, or Firm* — Brinks Hofer Gilson & Lione

(57) ABSTRACT

A method by which potential buyers are identified includes receiving a description of an item a potential buyer intends to purchase within a particular time, determining a reward for the potential buyer based on intent data, providing the reward to the potential buyer and applying a penalty to a financial account of the potential buyer if the potential buyer does not purchase the item within the particular time period. The system includes a controller coupled to at least one input device with the controller operable to compute a reward offer. The controller includes circuitry, or software, configured to compute and apply a penalty if the potential buyer does not purchase the item within the particular time period.

17 Claims, 11 Drawing Sheets

270

| POTENTIAL BUYER IDENTIFIER 271 | REWARD IDENTIFIER 273 | EXPIRATION DATE 275 | CONFIRMATION RECEIVED 277 | CONFIRMED ITEM DESCRIPTION 278 | PENALTY APPLIED 279 |
|---|---|---|---|---|---|
| 123-456-789 | ATTA-60 | 1/30/99 | - | - | COST OF ATTA-60 |
| 234-567-890 | AMFM-120 | 2/4/99 | 2/1/99 | SAME | - |
| 345-678-901 | CALC-40 | 2/6/99 | PENDING | PENDING | - |

U.S. PATENT DOCUMENTS

| | | |
|---|---|---|
| 5,056,019 A | 10/1991 | Schultz et al. |
| 5,173,851 A | 12/1992 | Off et al. |
| 5,202,826 A | 4/1993 | McCarthy |
| 5,256,863 A | 10/1993 | Ferguson et al. |
| 5,321,243 A | 6/1994 | Groves et al. |
| 5,331,544 A | 7/1994 | Lu et al. |
| 5,426,281 A | 6/1995 | Abecassis |
| 5,434,394 A | 7/1995 | Roach et al. |
| 5,459,306 A | 10/1995 | Stein et al. |
| 5,621,812 A | 4/1997 | Deaton et al. |
| 5,664,115 A | 9/1997 | Fraser |
| 5,717,989 A | 2/1998 | Tozzoli et al. |
| 5,758,328 A | 5/1998 | Giovannoli et al. |
| 5,758,329 A | 5/1998 | Wojcik et al. |
| 5,774,868 A | 6/1998 | Cragun et al. |
| 5,781,632 A | 7/1998 | Odom |
| 5,794,172 A * | 8/1998 | Matheson et al. ............ 701/117 |
| 5,794,207 A | 8/1998 | Walker et al. |
| 5,799,289 A | 8/1998 | Fukushima et al. |
| 5,808,894 A | 9/1998 | Wiens et al. |
| 5,857,175 A | 1/1999 | Day et al. |
| 5,895,454 A | 4/1999 | Harrington |
| 5,970,470 A | 10/1999 | Walker et al. |
| 5,970,475 A | 10/1999 | Barnes et al. |
| 6,078,906 A | 6/2000 | Huberman |
| 6,088,683 A | 7/2000 | Jalili |
| 6,233,564 B1 | 5/2001 | Schulze, Jr. |
| 6,415,261 B1 | 7/2002 | Cybul et al. |
| 6,415,262 B1 | 7/2002 | Walker et al. |

FOREIGN PATENT DOCUMENTS

| | | |
|---|---|---|
| WO | WO 97/44749 A1 | 11/1997 |
| WO | WO 98/57285 A1 | 12/1998 |
| WO | WO 99/03030 A2 | 1/1999 |
| WO | WO 99/03030 A3 | 1/1999 |

OTHER PUBLICATIONS

BPAI Decision dated Feb. 15, 2008 in related U.S. Appl. No. 10/642,894, 26 pages.

Petition Decision dated Aug. 29, 2008 in related U.S. Appl. No. 10/642,894, 2 pages.

Buchanan, Leigh, "A Business Model of One's Own", Inc. Magazine, Nov. 1998, p. 82, (http//www.inc.com/incmagazine/archives/11980821.htm).

Card Trak, "Gee What a Month", CardTrak Online, Sep. 1992.

Caulk, Steve, "Airline Industry Surrenders to Heavy Corporate Discounts", Rocky Mountain News, May 15, 1993, Section: Business, p. 58A.

"Cellular wrong signals", Newsday, Jul. 22, 1993, p. 39, ISSN: 0278-5587.

Definition of "Subscription", Merriam-Webster Collegiate Dictionary, (http.www.search.eb.com/dictionary), May 8, 2003.

Farnsworth, Allan E. "Your Loss or My Gain? The Dilemma of the Disgorgement Principle in Breach of Contract", Yale Law Journal, May 1985.

Glaser, Martha, "Buying Groups: What Have You Done for Me Lately?", Drug Topics, Jun. 8, 1992, vol. 136, No. 11, pp. 48-51, CODEN:DRTOAJ, ISSN: 0012-6616.

"Independent Petroleum Associate of America, et al. Appellants v. Bruce Babbitt, et al. Appellees", United States Court of Appeals for the District Court of Columbia Circuit, Argued Apr. 16, 1996, Decided Aug. 27, 1997, No. 95-5210, Consolidated with No. 95-5245.

Leibson, Beth, "Buying Contracts Deliver the Good, and Hefty Discounts Too"; Facilities Design & Management; Apr. 1991, vol. 10, No. 4; pp. 54-57, Dialog Abstract: ISSN: 0279-4438.

Love, Barbara, "Folio: Plus", The Magazine for Magazine Management, Nov. 15, 1995, vol. 24, No. 20, pp. 9-10, ISSN:0046-4333.

Mount, Charles, "Suits Say Airlines Overcharge for Cancellations", Chicago Tribune, Dec. 31, 1985, Section: Chicagoland, p. 11.

"Purchase Connection Announces New Committed Volume Buying Program", PR Newswire, Feb. 19, 1998, p. 219.

Ring, Alfred A., "Real Estate Principles and Practices", 7th Ed. (Prentice Hall, Englewood Cliffs, NJ.,1972, p. 317.

Robin, Michael, "Staking a Claim in the Digital Frontier", Micro Times, (http//www.microtimes.com/165/digitalfrontier.html), Copyright 1997.

Samuelson, Richard, A., "Accounting for liabilities to perform services", Accounting Horizons, Sep. 1993, vol. 7, No. 3, pp. 32-45, ISSN: 0888-7993.

Shanklin, Mary, "How to Avoid Buyer Blues; Expert Advice on What Not to Do if You're in the Market for a House", The Orlando Sentinel, Jun. 23, 1996, Section: Homes, p. J1.

Smith, Lionel D., "Disgorgement of the profits of breach of contract: Property, contract and 'efficient breach'", The Canadian Business Law Journal, Sep. 1994, vol. 24, Iss. 1, p. 121, ISSN: 0319-3322.

"Subscription Agreement for ICB Toll Free News Online Edition ("ICB")", Copyright 1997, IBC Inc.

Tinnelly, Bettyann; "The Custom Switch Isn't a Rare Choice Anymore—Benefits Outweigh Added Costs, Makers Say"; Electronic Buyers' News, Mar. 1994, No. 897. Mar. 28, 1994, see p. 3, lines 5-26.

"Toll Free Industry News and Information . . . 00 Numbers, Doman Names and Trademarks: *Save your Login Information*", ICB Toll Free.Com, (wysiwyg//12/http//icbtollfree.com/InfoSavePass.cfm), download date: Feb. 8, 2001.

"Toll Free Industry News and Information . . . 00 Numbers, Doman Names and Trademarks: *Login*", ICB Toll Free.Com, (wysiwyg//12/http//icbtollfree.com/InfoSavePass.cfm), download date: Feb. 8, 2001.

"Toll Free Industry News and Information . . . 00 Numbers, Doman Names and Trademarks: *Welcome to ICB Toll Free News*", ICB Toll Free.Com, (wysiwyg//12/http//icbtollfree.com/InfoSavePass.cfm), download date: Feb. 8, 2001.

"US Patent for Buyer-driven E-Commerce System is Issued to Priceline.com", Web Vantage Technology Guide for the Emerging Internet, (http/www.web-vantage.com/wv/980811n3 cfm), Aug. 11, 1998.

Website: "Atmel Corporation—Terms and Conditions of Purchase and Sale", (http//www.atmel.com/atmel/copyright.html), download date: Mar. 22, 1999.

Website: "Auction Terms & Conditions—Collectit.net", (http//www.collectit.net/info/auctiontc.html), download date: Mar. 22, 1999.

Website: "What is priceline.com? Where you name the price!", (http//www.priceline.com/PriceLineASPHonePage//html/company.htm), download date: Mar. 22, 1999.

Wettler, Mark A., "Evaluating Document Delivery Services", Database, Oct. 1, 1998, Section: No. 5, vol. 21, p. 73, ISSN: 0162-4105.

Williams, Dana, "Purchase Contracts", Computer Associates International Inc., Date of Release: Jan. 1992, Dialog Abstract: File 256, Acc# 01567035.

Yenckel, James T., "The impact on air fares; The bargains began", The Washington Post, Section: Sunday Travel, Fearless Traveler, Feb. 10, 1991, p. E1.

\* cited by examiner

| POTENTIAL BUYER NAME 231 | POTENTIAL BUYER IDENTIFIER 233 | PAYMENT IDENTIFIER 235 |
|---|---|---|
| JOHN SMITH | 123-456-789 | VISA 4226-1234-5678-9012 |
| BEN@DOMAIN.COM | 234-567-890 | WEB BUCKS 12345-789 |
| DAN STEVENS | 345-678-901 | E-CASH 4444-5555-6666 |

FIG. 3

| ITEM SPECIFICITY 241 | ITEM DESCRIPTION RATING 242 | DEGREE OF CERTAINTY 243 | CERTAINTY RATING 244 | TIME TO PURCHASE 245 | TIME RATING 246 |
|---|---|---|---|---|---|
| EXACT | 5 | 100% | 5 | 1 - 4 DAYS | 5 |
| VERY CLEAR | 4 | 80% | 4 | 5 - 8 DAYS | 4 |
| CLEAR | 3 | 60% | 3 | 9 - 12 DAYS | 3 |
| SEMI-CLEAR | 2 | 40% | 2 | 13 - 16 DAYS | 2 |
| VAGUE | 1 | 20% | 1 | 17 - 20 DAYS | 1 |
| NONE | 0 | 0% | 0 | 21+ DAYS | 0 |

FIG. 4

| POTENTIAL BUYER IDENTIFIER 251 | ITEM DESCRIPTION 252 | ITEM DESCRIPTION RATING 253 | CERTAINTY RATING 254 | TIME RATING 255 | REWARD RATING 256 |
|---|---|---|---|---|---|
| 123-456-789 | LARGE SCREEN TELEVISION | 2 | 4 (80%) | 5 (1 - 4 DAYS) | 11/15 |
| 234-567-890 | SONY PLAYSTATION | 5 | 3 (60%) | 4 (5 - 8 DAYS) | 12/15 |
| 345-678-901 | DELL COMPUTER | 4 | 5 (100%) | 1 (17 - 20 DAYS) | 10/15 |

FIG. 5

| POTENTIAL BUYER IDENTIFIER 271 | REWARD IDENTIFIER 273 | EXPIRATION DATE 275 | CONFIRMATION RECEIVED 277 | CONFIRMED ITEM DESCRIPTION 278 | PENALTY APPLIED 279 |
|---|---|---|---|---|---|
| 123-456-789 | ATTA-60 | 1/30/99 | - | - | COST OF ATTA-60 |
| 234-567-890 | AMFM-120 | 2/4/99 | 2/1/99 | SAME | - |
| 345-678-901 | CALC-40 | 2/6/99 | PENDING | PENDING | - |

| SELLER NAME 281 | SELLER ID NUMBER 283 | SELLER REWARD OFFER 285 | SELLER RETRIEVAL DATE OF POTENTIAL BUYER INTENT DATA 287 |
|---|---|---|---|
| FRED'S APPLIANCES | 987-654-321 | DISCOUNT COUPONS | 2/5/99 |
| THE CD PLAYER STORE | 654-321-987 | $25.00 | 2/7/99 |
| HOUSE OF COMPUTERS | 321-987-654 | MAIL-IN REBATE | 2/10/99 |

FIG. 11

METHOD AND APPARATUS FOR IDENTIFYING POTENTIAL BUYERS

CROSS-REFERENCE TO RELATED APPLICATIONS

This application is a continuation of U.S. patent application Ser. No. 10/642,894 entitled "METHOD AND APPARATUS FOR IDENTIFYING POTENTIAL BUYERS", filed Aug. 18, 2003 now abandoned; which is a continuation of U.S. patent application Ser. No. 09/349,860 filed Jul. 8, 1999 and now abandoned; which is a continuation-in-part of U.S. patent application Ser. No. 08/889,589 filed Jul. 8, 1997 and issued as U.S. Pat. No. 5,970,470. Each of the above referenced applications is incorporated by reference herein in its entirety.

BACKGROUND OF THE INVENTION

1. Field of the Invention

The present invention relates generally to demand forecasting systems.

2. Discussion of the Related Art

Most businesses use forecasting techniques to predict the future demand for their products or services. Anticipating these sales helps such businesses optimize inventory levels, adjust staffing requirements, or even set production schedules. A convenience store expecting heavy traffic for a summer holiday weekend, for example, might hire an extra employee and stock more cold beverages in anticipation of the higher level of sales. Automobile manufacturers might add a second shift to an assembly line if the demand for cars is expected to increase. Accurate forecasts allow companies to more appropriately allocate resources.

One way that sellers have attempted to predict demand is by projecting past sales into the future. For example, the airline industry uses past load factor data in order to help set current and future ticket prices. However, such projections of past data are speculative at best in that market conditions can change dramatically, rendering the historic data useless. There is simply no guarantee that the future is going to be similar to the past. Accordingly, projecting future sales based on past results is simply not a reliable forecasting tool for many businesses. Furthermore, such demand forecasting systems predict aggregate demand, rather than demand of individual customers.

Another method for attempting to predict demand is to try to anticipate new trends in the market. For example, a car manufacturer might predict that luxury vehicles are going to be more popular if the stock market experiences a substantial increase in value. Such projections are tenuous, however, since they ultimately rely on a past trend (luxury sales correlated with higher stock prices) continuing into the future.

Some businesses have limited access to demand data in the form of customer input. Many electronic commerce sites, for example, allow customers to place goods into "virtual shopping carts." Such shopping carts allow customers to store indications of products that they intend to purchase. Some demand information can be derived from which items are stored in these shopping carts, but e-commerce merchants do not know if the customers are actually going to purchase the products. There is no way for the business to know which items will actually be purchased.

Traditionally, prospective buyers have had little or no reason or method of informing sellers of their desire to purchase products before they actually purchase products, thus depriving sellers of useful consumer demand information. Rather, the only way that sellers have traditionally been able to collect such demand data is after customers have purchased products.

SUMMARY OF THE INVENTION

It is an object of the present invention to provide a potential buyer identification system that overcomes the drawbacks of existing demand forecasting systems by enabling sellers to identify a potential buyer before any purchases are made. The present invention provides a potential buyer identification system that encourages potential buyers to provide individual, specific demand information.

In the potential buyer identification system of the present invention, a potential buyer provides to a central server a description of an item he intends to purchase. Either the potential buyer or the central server specifies a time period in which the item is to be purchased. In exchange for the information provided, the potential buyer is offered a reward, such as a gift or a discount. The value of the reward may be based upon the amount and specificity of the information provided by the potential buyer, and/or the value of this information to sellers, such as manufacturers, retailers and distributors. When a description of the item is provided, the potential buyer is prompted to provide a payment identifier, such as a credit card or a debit card number. In this manner, the central server may apply a penalty to the potential buyer's financial account for failure to purchase the item within the specified time period.

A method of the present invention includes the steps of receiving at least a description of an item a potential buyer intends to purchase within a particular time period, determining a reward for the potential buyer based on the information received, providing the reward to the potential buyer, and applying a penalty to a financial account of the potential buyer if the potential buyer does not purchase the item within the particular time period. The apparatus includes a central server coupled to one or more input devices and operable to calculate a reward offer. It also includes circuitry, and/or software configured to compute and apply a penalty if the potential buyer does not purchase the item with the particular time period.

These and other features and advantages of the present invention will be understood upon consideration of the following detailed description of the invention and the accompanying drawings.

BRIEF DESCRIPTION OF THE DRAWINGS

FIG. 3 is a tabular illustration of a potential buyer database according to one embodiment of the present invention.

FIG. 4 is a tabular illustration of a rating database according to one embodiment of the present invention.

FIG. 5 is a tabular illustration of an intent database according to one embodiment of the present invention.

FIG. 7 is a tabular illustration of a penalty database according to one embodiment of the present invention.

FIG. 11 is a tabular illustration of a seller account database according to one embodiment of the present invention.

DETAILED DESCRIPTION OF THE PREFERRED EMBODIMENTS

Figure 1:
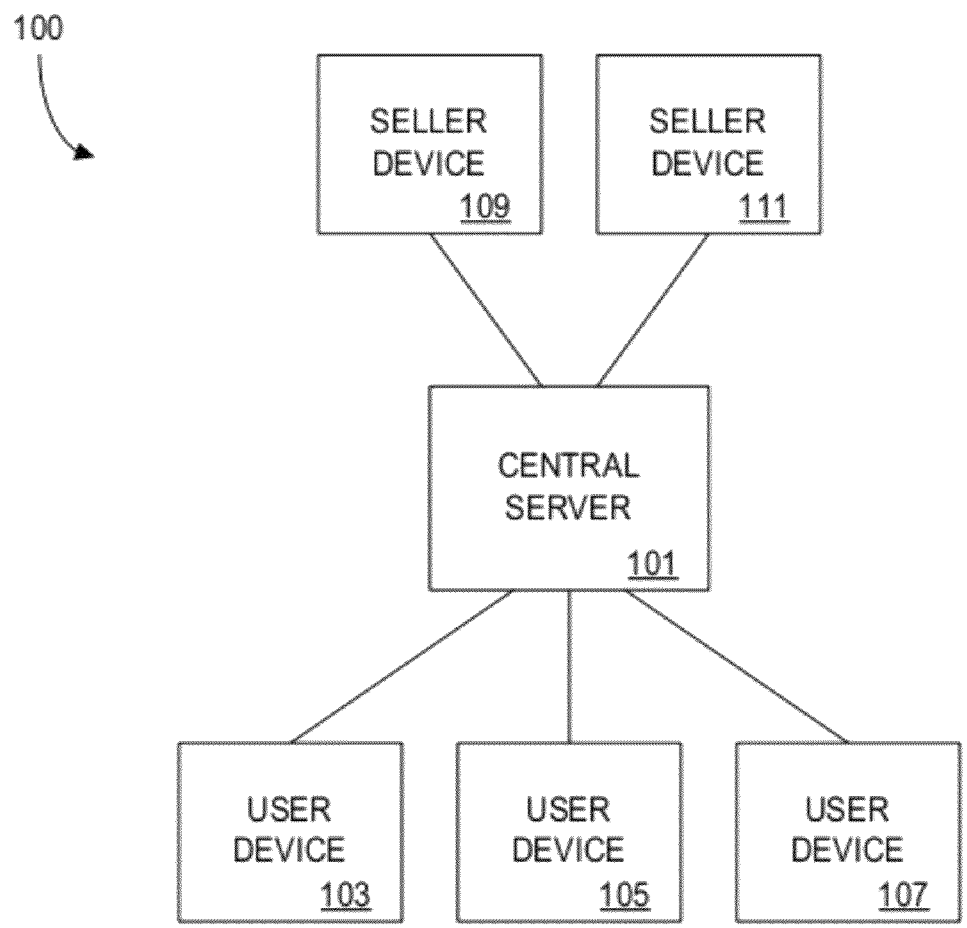
FIG. 1 is a block diagram overview of a potential buyer identification system according to an exemplary embodiment of the present invention.

A system embodying the present invention receives intent data from a potential buyer who intends to purchase a particular item within a particular time period. It should be understood that the term "item" need not be limited to goods, but could also include services, such as contractor services or videos downloaded to a viewer's multimedia display, as well as transactions that do not require delivery, such as the purchase of shares of stock. The intent data includes a description of the item and may also include other information, such as a degree of certainty with which the potential buyer intends to purchase the item, and a particular time period within which the potential buyer intends to purchase the item. The system determines a value of the intent data and identifies a reward based on that value. In this manner, the potential buyer may be rewarded for providing information about his intent to purchase one or more particular items. Thus, the potential buyer is more willing to provide such information, than if he were not rewarded. If the potential buyer decides not to purchase the item within the particular time period, the system charges a penalty to the potential buyer's credit card or other financial account.

For example, one potential buyer may provide the model number of a television that she is 100% certain she will purchase within one week. Another potential buyer may indicate that he is only 50% certain he will purchase a telephone within two months. Comparing the two, the information provided by the first potential buyer may be more valuable to sellers than that provided by the second potential buyer, because of the increased specificity, particularly the high degree of certainty set forth by the first potential buyer. Thus, the first potential buyer may receive an offer for a more valuable reward than the second potential buyer. However, if either of the potential buyers fail to purchase the television or telephone, respectively, within the time periods specified, a penalty will be applied to their respective financial account. In one embodiment, the amount of the penalty is dependent upon the value of the reward. Thus, the potential buyer who received a more valuable reward may also incur a greater penalty for failure to follow through with the purchase.

This system overcomes the disadvantages of the prior art demand forecasting systems because potential buyers are providing information about specific items that they individually intend to purchase in the future. Thus, sellers receive actual demand information directly from the consumer, rather than a speculative demand forecast based on an analysis of general consumer trends and sales history. An additional aspect of the present system, not present in prior art systems, is that potential buyers may be penalized for failing to follow through on their commitment to purchase the specified item. Thus, potential buyers have an incentive to provide reliable and accurate information. Furthermore, since the potential buyer receives a reward based on the information provided, the potential buyer is encouraged to provide as accurate and specific information as possible. Sellers may be allowed to market to potential buyers interested in products that the seller offers. Furthermore, sellers may be informed to discontinue marketing efforts to a potential buyer after the potential buyer purchases the item.

An example of a system embodying the present invention is illustrated in FIG. 1. A potential buyer identification system 100 according to the present invention includes a central server 101 coupled to one or more user devices 103, 105, 107 (only three are shown in FIG. 1 for illustrative purposes) and coupled to one or more seller devices 109, 111 (only two are shown in FIG. 1 for illustrative purposes). The central server 101 can be implemented as a system controller, a dedicated hardware circuit, a programmed general purpose computer, or any other functionally equivalent configurable electronic, mechanical, or electromechanical device. In a Web embodiment, for example, the central server 101 may comprise a Web server hosting a "portal" Web site or search engine. Alternatively, the central server may be operated by, for example, a credit card processor, a manufacturer, or a franchiser. The user devices 103, 105, 107 and seller devices 109, 111 can likewise be implemented as dedicated hardware circuits, programmed general purpose computers, or any other functionally equivalent configurable electronic, mechanical, or electro-mechanical devices. The devices can be connected to the central server 101 via an Internet connection using a public switched telephone network (PSTN) or cable network. Connection may also be provided by dedicated data lines, cellular, Personal Communication Systems ("PCS"), microwave, or satellite networks. Using these components, the present invention provides a method and apparatus which allows sellers access to demand information provided by potential buyers.

Figure 2:
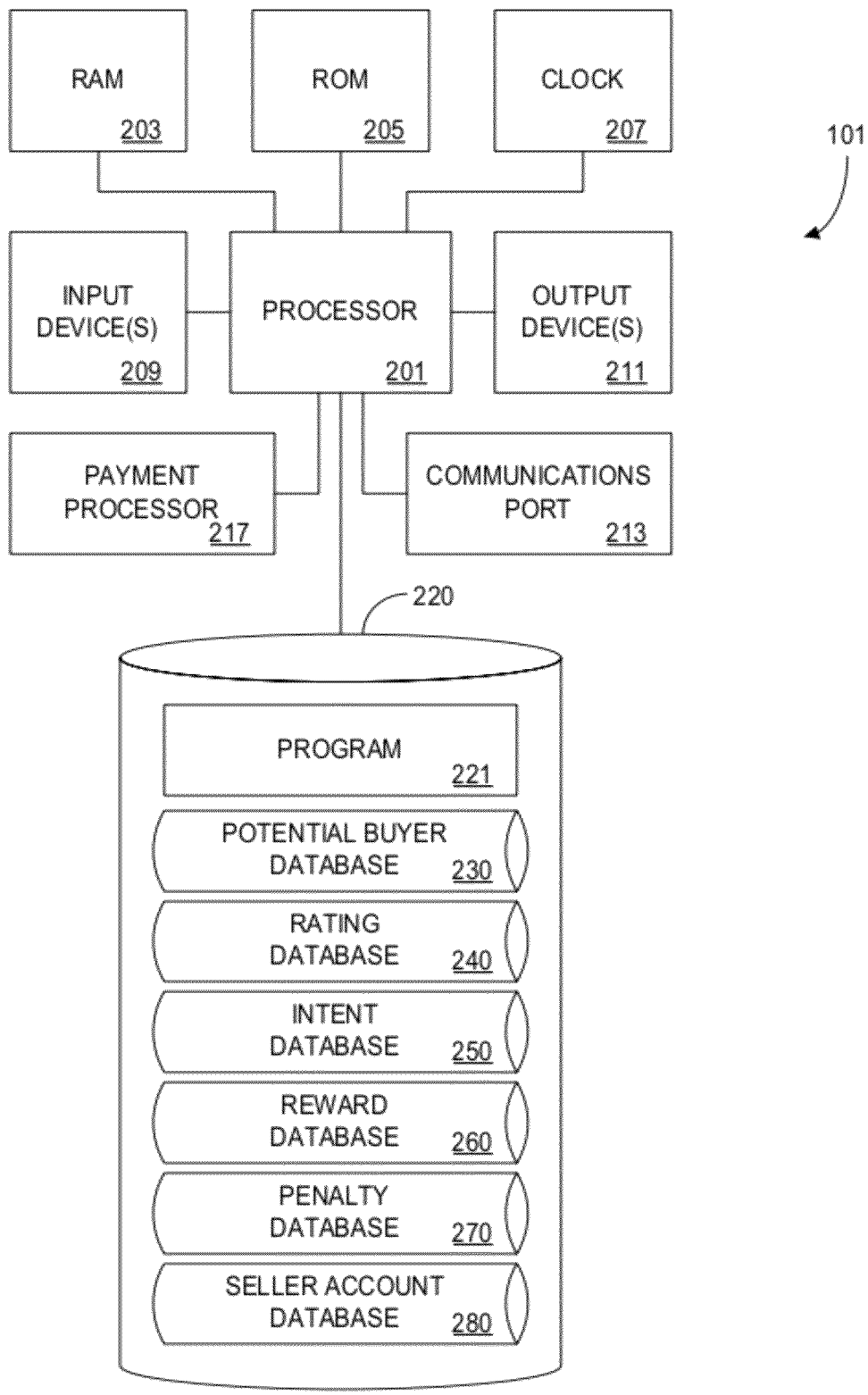
FIG. 2 is a block diagram of a central server according to one embodiment of the present invention.

As shown in FIG. 2, one embodiment of central server 101 includes a processor 201, a RAM (Random Access Memory) 203, a ROM (Read Only Memory) 205, a clock 207, one or more input device(s) 209, one or more output device(s) 211, a communications port 213 and a data storage device 220. In one embodiment, the central server 101 also includes payment processor 217 which may include one or more conventional microprocessors, supporting the transfer and exchange of payments, charges, or debits, attendant to the method of the apparatus. Payment processor 217 may also be configured as part of processor 201. Processing of credit card or other financial account transactions by payment processor 217 may be supported with commercially available software, such as the Secure Webserver® manufactured by Open Market, Inc. This server software transmits credit card information electronically over the Internet to servers located at the Open Market headquarters where card verification and transaction processing is handled.

A conventional personal computer or workstation with sufficient memory and processing capability may be used as central server 101. In one embodiment central server 101 operates as a Web server within an Internet environment, transmitting and receiving intent data generated by potential buyers and is capable of high volume transaction processing, performing a significant number of mathematical calculations in processing communications and database searches. A microprocessor such as the Pentium® III, manufactured by Intel® Corporation may be used for processor 201.

In an alternate embodiment, the central server 101 operates in a telephone environment. In such system, using a telephone, the potential buyer is prompted by an interactive voice response unit (IVRU) within the central server 101 to input certain information, such as financial account information, and data including a time period within which the potential buyer intends to purchase the particular item. For example, the IVRU may prompt the potential buyer to press "1" on the telephone keypad if she intends to purchase the item within one week, press "2" if she intends to purchase the item within two weeks, and so on. Such an embodiment of the central server 101 affords sellers an alternate mechanism to identify potential buyers. Alternatively, at least one human operator may be employed to facilitate communication between potential buyers and the central server 101.

In yet another embodiment, the central server 1001 communicates with a kiosk in a retail environment. A kiosk is essentially a self-service interactive system, typically a computer system placed inside a box-like structure, or a desktop computer system for use in performing transactions, distributing coupons, and/or providing information, such as providing a layout of a shopping facility to the general public. The kiosk may employ a touch screen as the input device. However, other input devices such as a mouse and/or a keyboard may also be used.

Referring again to FIG. 2, one or more input device(s) 209, such as a keyboard, mouse, touch screen or voice recognition package, are operable to receive information regarding intent to purchase specific items. Alternatively, the input device(s) 209 may be telephone keypads for use with IVRU technology in telephone systems.

One or more output devices 211 in the form of video displays, electro-luminescent arrays, liquid crystal display panels, printers, or functionally equivalent devices, are operable to output information regarding the status of potential buyer data being computed by the processor 201. In addition, or alternatively, the output device(s) 211 can be embodied within one or more of the user devices 103, 105, 107 of FIG. 1.

The central server 101 includes a clock 207 for synchronizing the system 100, determining the date and time at which the central server 101 receives information regarding potential buyers' intent to purchase a particular item. Clock 207 is also used for time related calculations in alternative embodiments described below, such as calculating the date by which the potential buyer intends to purchase a particular item, based on an input from the potential buyer. The processor 201 communicates with user devices 103, 105, 107 and seller devices 109, 111 via the communications port 213. The communications port 213 is preferably implemented using a T1 communications board, a serial port and modem, a LAN adapter, or any functionally equivalent communications device.

Data storage device 220 is preferably implemented using a memory system which may include random access memory, hard disk drives and/or other electronic, magnetic, or optical data recording units. In one embodiment, where the processor 201 is a general purpose microprocessor, the data storage device 220 stores a program 221 which includes instructions for executing the methods described herein, by the processor 201. The processor 201 is operable to load and run the program 221. In the embodiment of FIG. 2, the program 221 stores data accumulated or computed by the processor 201 on the data storage device 220. This stored data is preferably organized and indexed in one or more related relational databases 230, 240, 250, 260, 270 and 280.

In the example embodiment illustrated in FIG. 2, the related relational databases include a potential buyer database 230, a rating database 240, an intent database 250, a reward database 260, a penalty database 270, and a seller account database 280. Each of the databases is explained in detail with reference to FIGS. 3-7, and FIG. 11. One of ordinary skill in the art will recognize that the databases illustrated in FIGS. 3-7 and FIG. 11 may contain any number of records and that the records shown are for illustrative purposes only.

Potential buyer database 230, as illustrated in FIG. 3, maintains data pertaining to potential buyers in fields 231, 233, 235 such as potential buyer name field 231, potential buyer identifier field 233, and payment identifier field 235. The name of the potential buyer, and a payment identifier are obtained when a potential buyer first registers with the central server 101 through a user device 103, 105, or 107.

Referring now to the potential buyer name field 231, it will be appreciated that potential buyers are not required to use their name so long as a valid payment identifier is provided. For example, potential buyers can use an alias or an e-mail address. In the potential buyer name field 231 shown, three different potential buyers are listed "John Smith", "ben@domain.com" and "Dan Stevens".

The potential buyer identifier field 233 stores a unique identifier corresponding to each of the potential buyers who provide information regarding items they intend to purchase. This unique identifier might be a universally recognized/government issued personal identification number such as a United States Social Security Number of the potential buyer, an address, other unique personal information, or an identification number generated by the processor 201. In the exemplary potential buyer database 230 shown, three different corresponding potential buyer identifiers "123-456-789", "234-567-890", and "345-678-901", are listed, each corresponding to the potential buyers "John Smith", "ben@domain.com" and "Dan Stevens", respectively.

The payment identifier field 235 stores the payment information, such as financial account information, of each potential buyer. In the exemplary potential buyer database 230 shown in FIG. 3, three different payment identifiers, VISA™ 4226-1234-5678-9012, WEB BUCKS 12345-789, and E-CASH 4444-5555-6666, are listed corresponding to the potential buyers "John Smith", "ben@domain.com" and "Dan Stevens", respectively.

Referring to FIG. 4, an exemplary embodiment of rating database 240, is illustrated. The rating database 240 is used in calculating a reward offer based on the data that the potential buyer provides to the central server 101. In particular, the rating database 240 stores a rating assigned to data provided by potential buyers regarding their intent to purchase a particular item. An embodiment of the rating database 240 includes an item specificity field 241, an item description rating field 242, a degree of certainty field 243, a certainty rating field 244, a time to purchase field 245, and a time rating field 246.

Each of the fields 241, 243, 245 are assigned a rating, stored in fields 242, 244, and 246, respectively. In this embodiment of rating database 240, the data in each field is rated on a scale of "1" to "5", but it will be appreciated that other scales would suffice.

For purposes of illustration, the item specificity field 241 stores the following descriptions: exact, very clear, clear, semi-clear, vague and none. However, it will be appreciated that more or fewer item descriptions may be used. These descriptions represent the clarity or specificity with which the potential buyers describe the items they intend to purchase, which may be useful in determining the reward for which the potential buyer is eligible. In other words, it may be more valuable for a seller to know the name and model number of a particular television the potential buyer intends to purchase than to just know that the potential buyer intends to purchase a television. Knowing such specific information may permit sellers such as manufacturers, retailers, and distributors to better prepare for the demand by adjusting purchasing, inventory, manufacturing, and staffing needs according to the predicted demand. The degree of item specificity input by the buyer is assigned a rating from "1" to "5", which is stored in a corresponding record in the item description rating field 242. For example, in the embodiment shown in FIG. 4, an "exact" item description is assigned a "5", the highest rating, whereas a "vague" item description is only assigned a "1".

The degree of certainty field 243 stores a percentage representing the degree of certainty, i.e., how certain potential buyers are that they will purchase the item. Each degree of certainty is assigned a corresponding rating. For example, an 80% certainty that the item will be purchased is assigned a rating "4", whereas a 40% certainty that the item will be purchased is only assigned a rating of "2.". The ratings are stored in a corresponding record in the degree of certainty rating field 244.

The time to purchase field 245 stores a time period during which the potential buyer intends to purchase the item. Again, the time periods illustrated in the time to purchase field 245 are exemplary, and more, less, shorter or longer time periods may be selected. Each time period is also assigned a rating. Generally, the shorter the time period in which the potential buyer intends to purchase the item, the greater the value of the information to the sellers and therefore, the higher the rating. For example, a "5-8 day" time period is assigned a rating of "4", whereas a "17-20 day" time period is assigned a rating of "1". The "time to purchase" ratings are stored in the time rating field 246.

Referring now to FIG. 5, an exemplary embodiment of intent database 250 is shown. The intent database 250 contains pertinent data provided by the potential buyer and corresponding ratings which are used to determine an appropriate reward offer. The preferred embodiment of the intent database 250 includes a potential buyer identifier field 251, an item description field 252, a description rating field 253, a certainty rating field 254, a time rating field 255 and a reward rating field 256.

The potential buyer identifier field 251 stores a unique identifier for each potential buyer. In the example shown, three different buyer identifiers are listed: "123-456-789", 234-567-890", and "345-678-901". Note that these correspond to the three potential buyer identifiers listed in the potential buyer database 230 of FIG. 3.

The item description field 252 stores a description of the item the potential buyer intends to purchase. Three different entries are listed in the item description field 252, a large screen television, a SONY™ PLAYSTATION® and a DELL™ computer, corresponding to the entries in the potential buyer identifier field 251, "123-456-7891", 234-567-890", and "345-678-901" respectively. The description rating field 253 stores a rating of the item description the potential buyer intends to purchase. This rating is generated either automatically by the processor 201 of the central server 101 or by operators of the central server 101, based on the rating guidelines stored in the rating database 240. In general, ratings increase as degree of specificity increases. For example, referring to the first record of the intent database 250, John Smith (the potential buyer with the identifier "123-456-789" as shown in potential buyer database 230) has input an intent to purchase a large screen television. It is determined that John is to receive a rating of "2", for providing a semi-clear description of a product. This determination is made, for example, based on a scoring algorithm that determines how many products can be defined by the buyer-input specifications. In this case, there are dozens of large-screen televisions on the market, indicating a low degree of specificity input by the potential buyer. If John had input "large screen PANASOMC™ television with picture-in-picture," he may have received a better rating, because fewer items fall under this category, as indicated by the input item specifications.

Item characteristics can be provided by a potential buyer via a graphical user interface (GUI), for example, a series of drop-down menus, which allow potential buyers to select predefined characteristics of products that they intend to purchase. Each menu from which the potential buyer has selected a characteristic could increase the rating that the potential buyer receives. As above, if John had input (e.g. via GUI menu) an intent to purchase a: (1) SONY™ (2) television, with a (3) 50" screen, that would be three characteristics commanding a higher description rating. Alternatively, if John had input an intent to purchase a: (1) SONY™ (2) television with a (3) 50" screen and (4) picture-in-picture feature, that would be four characteristics commanding an even higher description rating.

The certainty rating field 254 indicates the degree of certainty with which the potential buyer intends to purchase the item listed in the corresponding item description field 252. For example, referring again to the first record of the intent database 250, John Smith has input that he is 80% certain that he will purchase the large screen television. Referring to the rating database 240 illustrated in FIG. 4, an 80% degree of certainty shown in field 243 corresponds to a rating of "4" in the rating field 243. Thus, referring back to the intent database 250 of FIG. 5, a rating of "4" is provided in the certainty rating field 254.

The time rating field 255 indicates the time period within which the potential buyer intends to purchase the item listed in the item description field 252. Referring again to the first record of the intent database 250, John Smith has indicated an intent to purchase the large screen television within 1-4 days as shown in field 255. The rating database 240 of FIG. 4, illustrates that a time period of 1-4 days in the time to purchase field 245 corresponds to a rating of "5" in the rating field 243. Thus, a rating of "5" is provided in the time rating field 255 of the intent database 250 shown in FIG. "5".

Although general rating guidelines have been provided above, any rating scheme may be employed by the central server 101. Additionally, each aspect of the input intent data may be weighed, for example, according to regression analysis. For example, potential buyer follow-through history (i.e., the potential buyers who purchase the product within the guidelines set forth) can be tracked, and analyzed. Based on the analysis, certain factors can be "weighted" heavier than others when a total rating is to be calculated. For example, it may be determined that potential buyers tend to purchase a product within the time frame set forth, but generally purchase a product other than the one that they specified when communicating with the central controller. If so, the central controller may weigh the "time to purchase" rating heavier by, for example, multiplying the calculated value by "1.5" before adding it to the total rating. This may effectively increase the importance of "time to purchase" relative to the importance of product specificity (which may have a weighting of "1") since the "time to purchase" aspect of the input intent data can statistically be relied on as more predictive of consumer behavior. Additionally, item information, such as retail price and/or margin may affect the reward offer.

It will be appreciated by one of ordinary skill in the art that other fields may also be included in the intent database 250, such as a potential buyer reputation field (not shown) which could store a reputation rating for each potential buyer. Such a reputation rating may be based on historical data such as the frequency with which a potential buyer provides information regarding his intent to purchase items, whether or not the buyer purchases the item within the required time period, confirms purchases within the required time, and/or incurs penalties, and/or based on the types or value of items purchased, financial account status, and/or a value of demographic information such as address, income, and/or age. For example, if potential buyer John Smith frequently provides information regarding his intent to purchase items, he may receive a high reputation rating, such as a "4". However, if John Smith frequently incurs penalties or has problems with his financial account, he may receive a low reputation rating, such as a "2".

Once a rating in each of the fields 253, 254, 255 has been determined, a sum of the ratings is calculated and stored in the reward rating field 256 of the intent database 250. For example, referring again to the first record of the intent database 250, John Smith (the potential buyer with the potential buyer identifier "123-456-789") has a reward rating of "11/15" indicating eleven points out of a possible maximum of fifteen. This reward rating is stored in the reward rating field 256 and used in the reward database 260 illustrated in FIG. 6 to determine the reward that will be offered to John. As will be apparent to one of ordinary skill in the art, other rating systems may be used by central server 101 to calculate appropriate rewards, besides the addition of the various ratings.

Figure 6:
FIG. 6 is a tabular illustration of a reward database according to one embodiment of the present invention.

Referring to FIG. 6, the reward database 260 stores various reward rating ranges in the reward rating range field 261 and a corresponding description of the reward in the reward description field 265. In the exemplary embodiment illustrated, the higher the total rating the more valuable the reward. Typically, the reward database 260 also stores an identification of the reward, such as a model number of the reward, in the reward identifier field 263. It will be appreciated that the rewards provided in the reward description field 265 are for illustrative purposes only and any type of reward and/or number of rewards may be offered, such as coupons, discounts, rebates, products, vouchers, services and/or money. It will also be appreciated that the rating ranges provided in the reward rating range field 261 are exemplary and any type of rating scale may be used. As described above, each rating may be weighted before being summed, to yield a reward rating.

Referring again to the intent database 250 of FIG. 5, the potential buyer identified as John Smith has a reward rating of "11" stored in the reward rating field 256. This reward rating falls within the range "10-12" in the reward rating range field 261 of the second row of the reward database 260 shown in FIG. 6. Following the row over to the reward description field 265, it can be seen that John qualifies for an travel bag as his reward. The reward database 260 also illustrates that potential buyers having a reward rating in the range "13-15" qualify for a portable AM/FM radio, in the range "7-9" qualify for a free compact disc from AMAZON.COMT™, in the range "4-6" qualify for a pocket calculator, and in the range "1-3" qualify for a free liter of PEPSP™. Although the exemplary reward database 260 shows that a potential buyer. only qualifies for one reward for each reward rating, a potential buyer may qualify for multiple rewards.

Illustrated in FIG. 7 is an exemplary embodiment of the penalty database 270. This database 270 maintains data regarding the time by which the potential buyer has to purchase the item before a penalty is applied to the potential buyer's financial account. The database includes a potential buyer identifier field 271, a reward identifier field 273, an expiration date field 275, a confirmation received field 277, a confirmed item description field 278, and a penalty applied field 279. The potential buyer identifier field 271 corresponds to the potential buyer identifier field 233 of potential buyer database 230 shown in FIG. 3. The potential buyer identifier field 271 stores a unique identifier for each of the potential buyers providing information on the items they intend to purchase. The reward identifier field 273 corresponds to the reward identifier field 263 of the reward database 260 shown in FIG. 6, which stores a unique identifier for each reward offered. The expiration date field 275 stores the date by which the potential buyers intend to purchase the item. This date is either specified by the buyer or by the central server 101. The confirmation received field 277 stores the status of the potential buyer's purchasing confirmation. The penalty applied field 279 stores data pertaining to any penalty applied against a potential buyer's financial account for failure to purchase or confirm the purchase of the item.

The confirmed item description field 278, stores a description of the item the potential buyer actually purchases. For example, the second record of penalty database 270 indicates that ben@domain.com purchased an item with the "same" description as that in the item description field 252 of intent database 250 shown in FIG. 5. However, if ben@domain.com had purchased a SEGA® DREAMCAST™ instead of a SONY™ PLAYSTATION®, the SEGA® DREAMCAST™ description would appear in the confirmed item description field 278. For example, referring to the first record in the penalty database 270, John Smith, the potential buyer with potential buyer identifier "123-456-789" as indicated in the potential buyer database 230 shown in FIG. 3, has received a reward corresponding to reward identifier ATTA-60. From the reward database 260 of FIG. 6, it is determined that the reward identifier ATTA-60 corresponds to a travel bag, which was the reward issued to John Smith. Referring now to intent database 250 of FIG. 5, John Smith has indicated that he intends (80% certain) to purchase a large screen television in 1-4 days. Assuming that John input that information on Jan. 26, 1999, an expiration date of Jan. 30, 1999 (four days after Jan. 26, 1999) is stored in the expiration date field 275. The confirmation received field 277 indicates on the expiration date of Jan. 30, 1999, no confirmation indicating that John had purchased the television had been received. Assuming that the current date is Feb. 2, 1999 (i.e. after the expiration date), the cost of the travel bag is charged to John's financial account, as shown in the penalty applied field 279. Additionally, a "service fee" may be applied to John's account.

As a further example, ben@domain.com, the potential buyer with potential buyer identifier 234-567-890 (as shown in the potential buyer database 230 of FIG. 3), has indicated that he intends (60% certain) to purchase a SONY™ PLAYSTATION® by Feb. 4, 1999, shown in the expiration date field 275. Since he confirmed his purchase of the SONY™ PLAYSTATION® on Feb. 1, 1999, as shown in the confirmation field 277, no penalty is applied to his financial account, as shown in the penalty applied field 279.

The third record, indicates that Dan Stevens, the potential buyer with potential buyer identifier 345-678-901 (as shown in the potential buyer database 230 of FIG. 3) has indicated that he intends (100% (certain) to purchase a Dell computer by Feb. 6, 1999, shown in the expiration date field 275. Although he has not confirmed that he has purchased the Dell computer, the time by which he has to purchase the computer has not expired. The confirmation field 277 indicates that confirmation is "pending" (i.e. no confirmation has been received by the central server 101), and no penalty has been applied to his financial account, as shown in penalty applied field 279.

FIG. 11 illustrates a seller account database 280 which stores all seller information in fields such as seller name 281, seller identifier 283, seller reward offer 285, and seller retrieval date of potential buyer intent data 287. The seller name field 281 stores data representing the name of the seller.

The seller identifier field 283 uniquely identifies each seller. The seller reward offer field 285 stores an indication of the reward currently offered by each seller. Seller reward offer field 285 may contain a number of rewards, depending on the number of rewards offered at a given time by each seller. Seller retrieval date of buyer offer field 287 stores the date on which the seller retrieved information set forth by a potential buyer (i.e. intent data). Sellers are allowed to retrieve such information in order to selectively offer rewards to specific potential buyers. For example, a potential buyer may input that he is interested in purchasing a stereo. Sellers may be allowed access to such information, including a potential buyers contact information. A potential buyer may indicate via a GUI that he will accept communications from sellers, and authorize the central server to allow sellers access to a limited amount of contact information for an amount of time (e.g. the input "time to purchase"). If so, the seller can communicate with the potential buyer in order to help him find an appropriate product, and additionally offer rewards to the potential buyer, such as coupons or rebates applicable to specific products, offered before of after the product is purchased. In an alternate embodiment, the central server does not offer rewards at all, instead, sellers offer rewards directly to potential buyers, based on information stored in the seller account database. The seller account database 280 may be stored locally, and allows the central server 101 to track and manage all the seller transactions.

Figure 8:
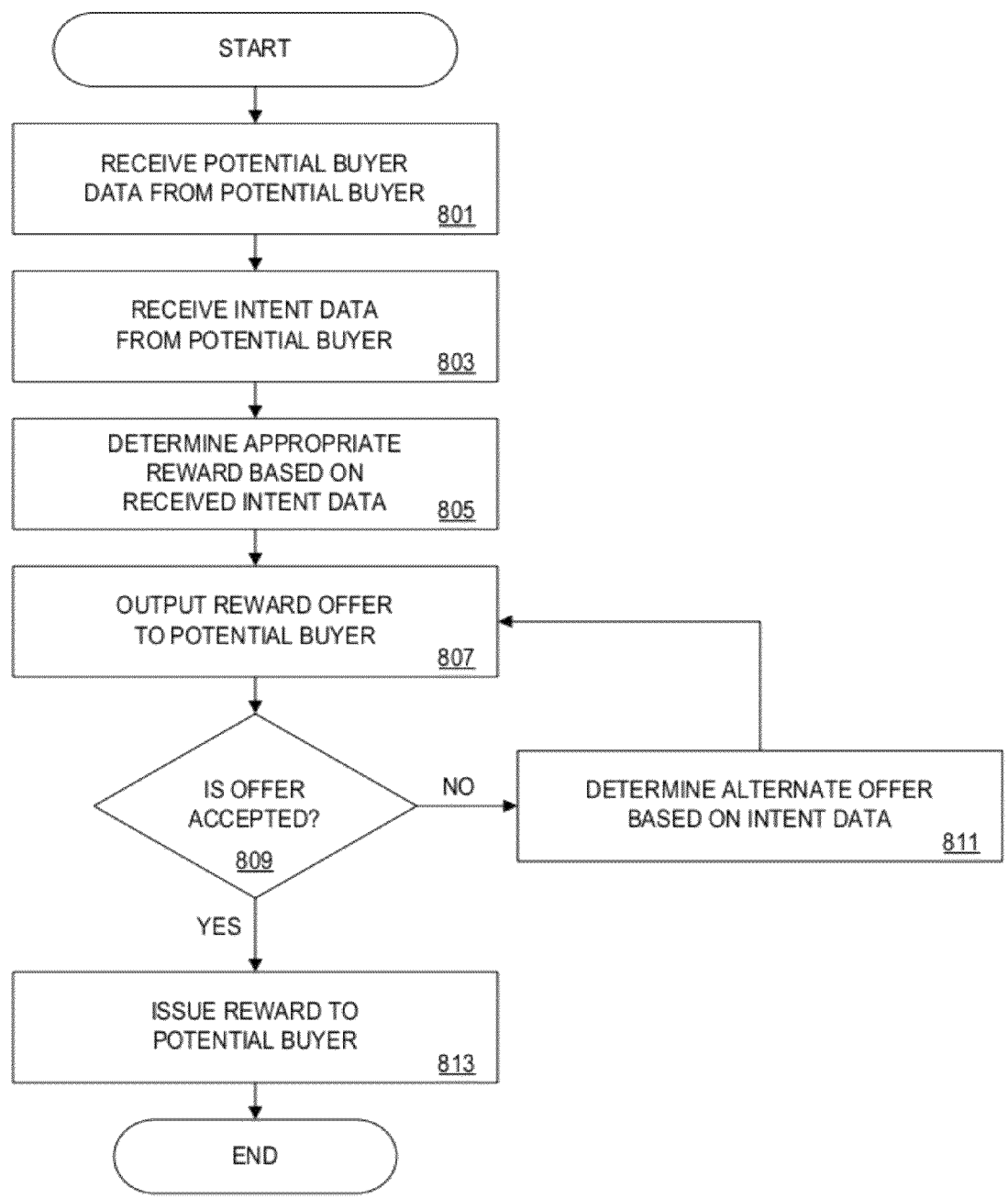
FIG. 8 is a process flowchart illustrating one embodiment of a method of the present invention.

FIG. 8 is a process flowchart illustrating one embodiment of the method of the present invention. In step 801, the central server 101 receives potential buyer data from a potential buyer. This data may include at least a unique identifier for the potential buyer, such as a user name and password or a universally recognized/government issued personal identification number such as a United States Social Security Number of the potential buyer. The data may also include the name of the potential buyer and a payment identifier, such as a bank account identifier, debit card account identifier, credit card account identifier, indication of electronic cash, or any other account to which a charge can be applied. The central server 101 may request additional information such as contact information (e.g. street address, home address, e-mail address, telephone number, etc.), demographic information (e.g. location, income, age, etc.), and shopping or purchasing habits. Upon receiving this potential buyer data, the central server 101 creates a new record in the potential buyer database 230 illustrated in FIG. 3 to store the data.

Some potential buyers may not want to provide a payment identifier. In one embodiment, these potential buyers will not be able to receive a reward for providing intent data, because the central server 101 would have no way to charge (i.e., penalize) them if they fail to purchase the item within the particular time. In another embodiment, the central server 101 may offer less valuable rewards to those potential buyers who do not want to provide a payment identifier. In this way, the central server 101 is still able to obtain demand information and no penalty structure is required. For example, a potential buyer who does not provide a payment identifier may receive rewards such as advertisements and coupons targeted toward the potential buyer's spending habits or toward an item similar to the item that the potential buyer intends to purchase.

In step 803, the central server 101 receives intent data from the potential buyer. This data includes at least a description of an item the potential buyer intends to purchase within a particular time period. The time period and/or the item description can be specified by the potential buyer. For example, the potential buyer may indicate an intent to purchase a television within five days. Alternatively, the central server 101 may specify the time period and/or the item description. The central server 101 may display a message such as "click here if you are going to buy a television within the next week" or "click here if you are going to buy a television within the next two weeks." Potential buyers would then click on the appropriate controls and provide data such as a payment identifier and specific product description.

In either embodiment discussed above, the intent data may include a degree of certainty with which the potential buyer intends to purchase the item within the particular time, a payment identifier, a type of store from which the potential buyer intends to purchase the item, and demographic information. For example, a potential buyer may be 60% certain that she will purchase the item within the particular time period. In one embodiment, the payment identifier is provided in step 801 as part of the potential buyer data. In an alternate embodiment, the payment identifier is provided in step 803 as part of the intent data. In yet another embodiment, the payment identifier is not provided at all, as explained above. The potential buyer may provide demographic information (e.g. street address and state, income level, and/or age) or a purchasing profile (e.g. the types of merchants the potential buyer frequents, which may be online or retail shopping). This intent data is stored in the intent database 250 illustrated in FIG. 5.

In Step 805, the central server 101 determines an appropriate reward based on the intent data received from the potential buyer. As explained with reference to the intent database 250 illustrated in FIG. 5, a rating may be assigned to each piece of information provided by the potential buyer. Referring to the intent database 250 of FIG. 5 and the reward database 260 of FIG. 6, a sum of all the ratings for a particular potential buyer may determine a reward that the potential buyer is eligible to receive.

In one embodiment, once the central server 101 determines a reward for which the potential buyer is eligible, the central server 101 outputs the reward offer to the potential buyer in step 807. In an alternate embodiment, the central server 101 may determine multiple rewards for which the potential buyer is eligible and permit the potential buyer to select one or more of the rewards. In another embodiment, a potential buyer may get a reward, such as a discount or rebate, after the central server 101 receives a confirmation signal from the potential buyer. For example, a potential buyer's financial account may be credited a predetermined amount (i.e., the amount of the reward) if the central server receives a confirmation signal indicating that the potential buyer purchased the item within the particular time period. In yet another embodiment, the central server 101 may offer a particular reward to encourage potential buyers to provide information about items they intend to purchase. For example, the central server 101 may display a message "Planning to buy a stereo? If so, click here and you may receive a free CD from AMAZON.COM™!" Then, potential buyers could be prompted to provide information about the stereo they intend to purchase.

A preferred embodiment includes a step 809 in which the potential buyer can either accept or reject the reward offer. If the reward offer is rejected then the central server 101 determines an alternate reward offer based on the intent data in step 811, and repeats steps 807, 809, and 811 until the potential buyer either cancels the transaction or accepts a reward offer. If the potential buyer cancels the transaction, the process terminates. But, if the potential buyer accepts the reward offer, then in step 813 the central server 101 issues the reward to the potential buyer. The buyer may be prompted to input a valid address to which the reward may be delivered. Alternatively, the buyer may be directed to an e-commerce merchant's Web page and provided with an electronic gift certificate redeemable for the selected reward.

Figure 9:
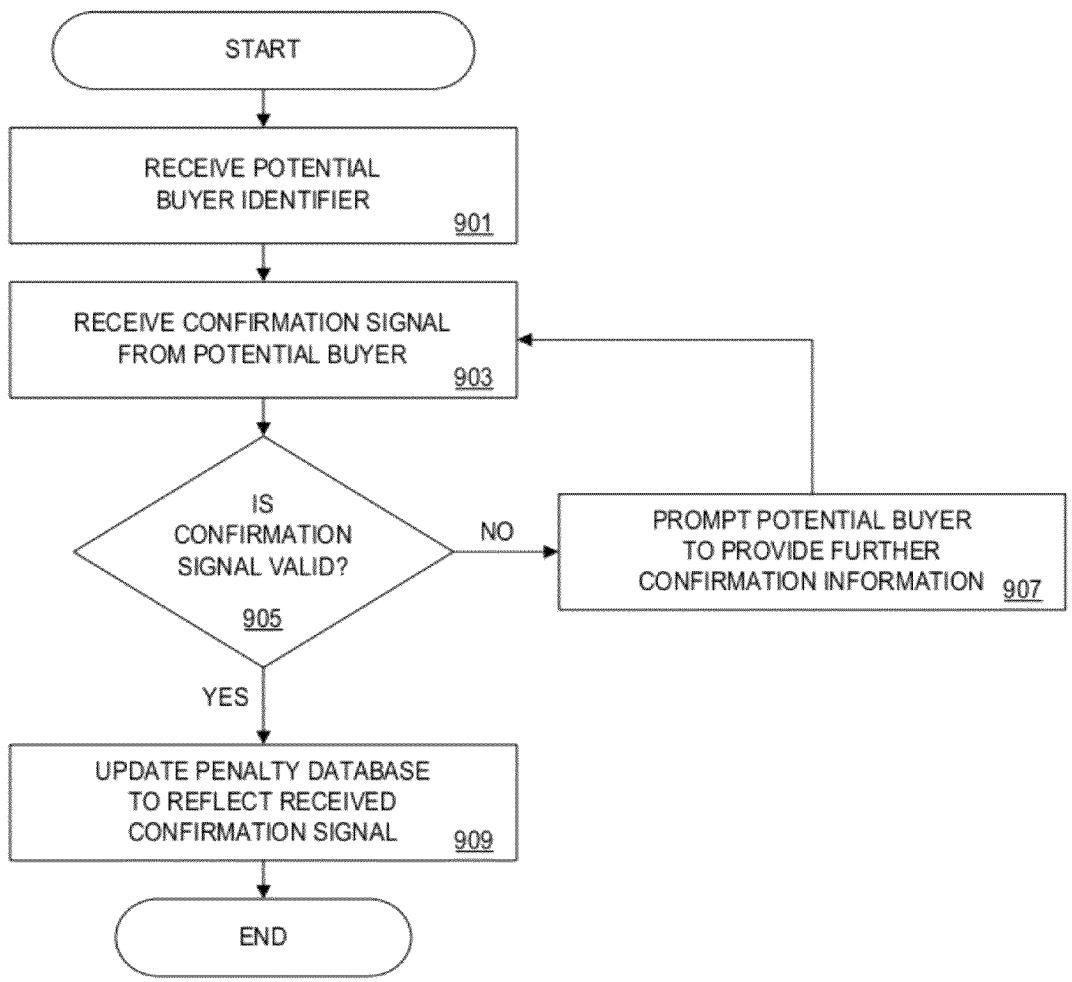
FIG. 9 is a process flowchart illustrating one embodiment of another method of the present invention.

FIG. 9 is a process flowchart illustrating an example embodiment of the method for receiving a confirmation signal from the potential buyer of the present invention. In step 901 the potential buyer inputs his potential buyer identifier which is received by the central server 101. As described above, this identifier can include a name, password, social security number and/or payment identifier.

In step 903 the central server 101 receives a confirmation signal that the potential buyer has purchased the item within the specified time period. In one embodiment, the potential buyer provides confirmation information to the central server 101 indicating that he has purchased the item within the specified time period. For example, once the potential buyer provides his unique identifier, the central server 101 may display a list of all the pending items the potential buyer intends to purchase, but still has not purchased. To confirm a purchase, the potential buyer then checks a box next to the item he has purchased. Alternatively, the potential buyer may be required to provide specific information pertaining to the item, such as the serial number of the item, that the central server 101 can use to verify that the potential buyer has indeed purchased what he claimed he would. For example, the central server 101 can query a manufacturer's database to verify the validity of a serial number input by the potential buyer. If the potential buyer purchases the item online or over the telephone, the potential buyer can provide the central server 101 with a transaction identifier that can serve as a confirmation number, which can indicate that the potential buyer has purchased what he claims to have purchased. For example, the potential buyer may receive a confirmation e-mail from the merchant from whom the item was purchased and then forward the e-mail to the central server 101. The potential buyer may also mail or fax a proof-of-purchase from the packaging of the item, a receipt, a voucher or a rebate, or forward a copy of a credit card bill or a receipt to the central server 101 along with the potential buyer identifier.

In an alternate embodiment, the central server 101 receives confirmation information from someone other than the potential buyer. For example, the potential buyer's credit card company could notify the central server 101 when the purchase is made, or the seller of the item could notify the central server 101, for example, via a point-of-sale (POS) system once the purchase has been made. Although examples have been provided, other modes of confirming that the potential buyer has purchased the item within the specified time may be used so long as the mode used provides the central server with an indication of the date the item was purchased.

In step 905 the central server 101 determines whether the confirmation signal is valid. For example, the central server 101 determines whether the confirmation signal was received before the expiration of the potential buyer-input "time to purchase". Also, the central server 101 may query the seller or manufacturer databases to determine whether a serial number, proof-of-purchase number, or other unique item identifier is valid, and, based on the item identifier, the degree to which the purchased item corresponds to the input item. If the central server 101 determines the confirmation is not valid, then in step 907 the central server prompts the potential buyer to provide further confirmation information, and steps 903, 905, 907 are repeated until the confirmation is determined to be valid. Then at step 909 the central server updates the confirmation received field 277 of penalty database 270 illustrated in FIG. 7, to indicate whether the confirmation signal has been received. Generally, if the information pertaining to the purchased item is similar to the information pertaining to the input item, the confirmation signal will be determined to be valid, despite any penalties the potential buyer may incur. An indication of the similarity of the input and purchased items is written to the confirmed item description field 278.

Figure 10:
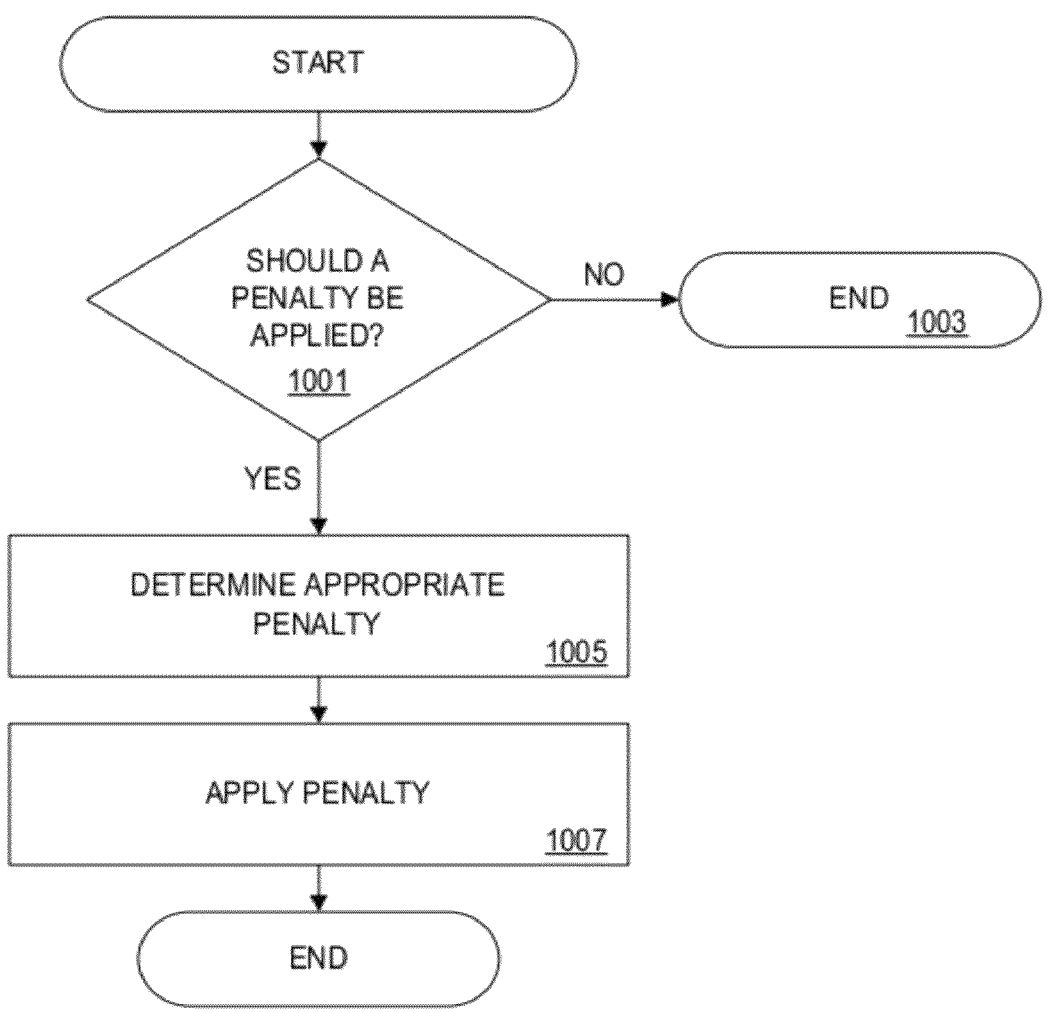
FIG. 10 is a process flowchart illustrating one embodiment of yet another method of the present invention.

FIG. 10 illustrates a process by which a penalty is applied in the present invention. Preferably, this process is performed periodically, for example, hourly or daily. In step 1001, the central server 101 determines whether a penalty should be applied to the potential buyer's financial account. In the preferred embodiment, the central server 101 makes this determination by comparing the current date to the expiration date field 275 in the penalty database 270 shown in FIG. 7, and by checking the confirmation received field 277 in the database 270. If the current date is before the expiration date the process ends at step 1003. Also, if the current date is after the expiration date but the confirmation field 277 of the penalty database 270 indicates that a valid confirmation has been received, then the process ends at step 1003.

On the other hand, if the current date is after the expiration date and the confirmation received field 277 indicates that a confirmation has not been received, then the central server 101 determines that a penalty should be applied to the potential buyer's financial account. The central server 101 determines the appropriate penalty (step 1005) and processes the penalty against the appropriate potential buyer's financial account (step 1007).

In one embodiment, the central server 101 determines whether a penalty should be applied by comparing the item description field 252 of the intent database 250 shown in FIG. 5 and the confirmed item description field 278 of penalty database 270 of FIG. 7. Even if the current date is on or before the expiration date, if the confirmed item description field 278 indicates that the potential buyer purchased an item significantly different from that provided in the item description field 252 of the intent database 250, the central server 101 may determine that a partial penalty or a full penalty should be applied. For example, referring to the intent database 250 of FIG. 5, the first record indicates that John Smith, the potential buyer having the buyer identifier "123-456-789" as shown in the potential buyer database 230 of FIG. 3, intends to purchase a large screen television in 1-4 days. If John Smith purchases a small screen television instead of the large screen television, the central server 101 may determine that no penalty, or a fraction of the penalty fee that would have applied if John Smith had not purchased anything, should be applied to John Smith's financial account. If John Smith purchased an extra large screen television, the central server 101 may determine that a partial penalty, no penalty, or even that a greater value reward should be issued to John Smith. In one embodiment for each item the potential buyer intended to buy, there can be one or more corresponding entries in a database (not shown) to indicate a respective partial penalty amount for similar items that are instead purchased.

A purchased item may be considered similar to the item the potential buyer indicated that he would purchase if: (i) an item identifier associated with the purchased item is stored in a database listing similar items; (ii) the purchased item is in the same item category (e.g. televisions); or (iii) one or more item features of the purchased item correspond to one or item features of the item the potential buyer indicated that he would purchase.

The central server 101 may also apply a partial penalty when the potential buyer purchases the item after the expiration date, or when the potential buyer purchases the item before the expiration date, but fails to transmit confirmation information to the central server 101 until after the expiration date.

In step 1005 the central server 101 determines an appropriate penalty to be applied to the potential buyer's financial account. In the preferred embodiment, the appropriate penalty is the cost or value of the reward issued to the potential buyer, which may be the price of the reward in the marketplace, the cost of the reward to manufacture, or the cost of the reward to the seller. In an alternate embodiment, if the reward issued was a discount, voucher, or rebate on the item purchased, the appropriate penalty may be the amount of the discount, voucher or rebate and/or a shipping and/or handling charge. In yet another embodiment, the appropriate penalty may be an arbitrary fee, such as $20.00.

If the central server 101 determines that a partial penalty should be applied to the potential buyer's financial account, then the appropriate penalty may depend upon several factors. For instance, if the potential buyer purchased a different item than the item originally specified, then the partial penalty may depend upon the relatedness between the item purchased and the item intended to be purchased. In the example provided above, John Smith purchased a small screen television instead of the large screen television. Referring to the penalty applied field 279 of the penalty database 270 shown in FIG. 7, the first record indicates that John Smith's penalty for failing to purchase the large screen television within 1-4 days is the cost of ATTA-60, the travel bag. Since a small screen television is similar to a large screen television, the central server 101 may apply no penalty or a smaller penalty to John Smith's financial account. However, if John Smith purchased a video cassette recorder instead of the large screen television, then the central server 101 may apply a penalty closer to the cost of ATTA-60 to John Smith's financial account.

In the instance when the potential buyer purchased the item after the expiration date, the appropriate partial penalty may depend upon the amount of time that passes between the expiration date and the purchase date. For example, if John Smith purchased the large screen television one day after the expiration date, the penalty would be less than if he purchased the large screen television one week after the expiration date. For example, the total amount of a penalty may be charged incrementally over time, specifically, over the time after the date by which the potential buyer committed to purchase the item. Similarly, when the potential buyer fails to transmit the confirmation information prior to the expiration date, the appropriate penalty may depend upon the amount of time that passes between the expiration date and the date the central server receives the confirmation information. The central server 101 may apply the total penalty to the potential buyer's financial account, and then refund a portion of the penalty once the appropriate confirmation information is received.

In one embodiment, the central server 101 may determine an appropriate penalty by comparing the reward rating associated with the intent data input by the potential buyer, to the reward rating associated with actual data (i.e., data representing the actions taken by the potential buyer). Referring to the above example, John Smith input that he was 80% (rating: 4) certain to purchase a large screen television (rating: 2) within 1-4 days (rating: 5), and subsequently received a reward rating of 11/15 (4+2+5=11). Assuming that he purchased the television on the fifth day, and that he had registered intent to purchase the television within 5-8 days, the central server 101 may determine the resultant reward rating to have been calculated as 10/15 (4+2+4=10). Thus, the central server 101 may subtract the resultant actual reward rating from the reward rating associated with intent data registered by the potential buyer. In the example given, the difference is one (1) (i.e. 11−10=1). Based on the difference between the actual data and the intent data, the central server 101 may then calculate an appropriate proportional penalty.

In an alternate embodiment, potential buyers may be charged a periodic penalty. In this embodiment, potential buyers are charged a percent of the total penalty for each period of time that they are delinquent in transmitting confirmation information. For instance, take the example when a potential buyer is to be charged a total penalty of $10.00 if a confirmation signal is not sent by the expiration date. The first day after the expiration date, the potential buyer's financial account is charged $2.00 (i.e., 20% of the total $10.00 penalty). The second day after the expiration date, the potential buyer's financial account is charged another $2.00 (another 20% of the total penalty), and so on until the total $10.00 penalty is charged, or until the confirmation signal is received.

Although several embodiments directed toward how the central server 101 determines the application of a penalty have been discussed, it will be appreciated by one of ordinary skill in the art that such discussions are exemplary. The penalty application decisions will be made at the discretion of the central server operators.

While the method and apparatus of the present invention has been described in terms of its presently preferred and alternate embodiments, those skilled in the art will recognize that the present invention may be practiced with modification and alteration within the spirit and scope of the appended claims. The specifications and drawings are, accordingly, to be regarded in an illustrative rather than in a restrictive sense.

Further, even though only certain embodiments have been described in detail herein, those having ordinary skill in the art will certainly understand that many modifications are possible without departing from the teachings thereof. All such modifications are intended to be encompassed within the following claims.

What is claimed is:

1. A method for identifying potential buyers, comprising:
   receiving intent data from a potential buyer, wherein the intent data identifies a consumer hard good or a store service the potential buyer intends to purchase at a future time under at least one condition;
   determining a reward for the potential buyer in response to receiving the intent data;
   offering the reward to the potential buyer in exchange for the potential buyer providing the intent data;
   determining whether the potential buyer purchased the consumer hard good or the store service under the at least one condition; and
   in response to determining that the potential buyer did not purchase the consumer hard good or the store service under the at least one condition, applying a penalty to an account of the potential buyer.

2. The method of claim 1, further comprising:
   calculating the penalty from a value of the reward.

3. The method of claim 1, wherein applying the penalty comprises:
   receiving a confirmation that the potential buyer has purchased within a particular time period a similar consumer hard good or a store service to the consumer hard good or the store service the potential buyer intended to purchase; and
   applying a partial penalty to the account of the potential buyer, wherein the partial penalty is less than a total penalty charged when the potential buyer fails to purchase the consumer hard good or the store service under the at least one condition.

4. The method of claim 1, wherein applying the penalty to the potential buyer comprises:
   receiving a confirmation that the potential buyer has purchased within a particular time period a similar consumer hard good or a store service to the consumer hard good or the store service the potential buyer intended to purchase; and
   applying a partial penalty to the account.

5. The method of claim 1, wherein the at least one condition comprises a particular time period; and
   wherein determining whether the potential buyer purchased the consumer hard good or the store service under the at least one condition comprises determining whether the potential buyer purchased the consumer hard good or the store service within the particular time period.

6. The method of claim 1, wherein determining the reward for the potential buyer is based on the intent data.

7. The method of claim 1, wherein the intent data identifies the consumer hard good the potential buyer intends to purchase; and
   wherein determining whether the potential buyer purchased the consumer hard good or the store service under the at least one condition comprises determining whether the potential buyer purchased the consumer hard good.

8. The method of claim 1, wherein the penalty applied is dependent on the reward.

9. A method for identifying potential buyers, comprising:
   receiving a description of a consumer hard good or a store service a potential buyer intends to purchase within a particular time period, the description having a degree of specificity;
   receiving a degree of certainty with which the potential buyer intends to purchase the consumer hard good or the store service by within the particular time period;
   determining a reward offer associated with a reward based on at least one of the degree of specificity, the degree of certainty, and a length of the particular time period;
   outputting the reward offer to the potential buyer, in which the reward offer comprises an offer for the potential buyer;
   receiving a confirmation signal indicating that the potential buyer purchased the consumer hard good or the store service;
   determining based on the confirmation signal whether the potential buyer purchased the consumer hard good or the store service within the particular time period; and
   in response to determining that the potential buyer did not purchase the consumer hard good or the store service within the particular time period, applying a penalty to an account of the potential buyer.

10. The method of claim 9, further comprising: calculating the penalty based on a price of a reward associated with the reward offer.

11. A method for identifying potential buyers, comprising:
    receiving intent data from a potential buyer, wherein the intent data identifies a consumer hard good the potential buyer intends to purchase under at least one condition;
    determining a reward for the potential buyer in response to receiving the intent data;
    offering the reward to the potential buyer in exchange for the potential buyer providing the intent data;
    determining whether the potential buyer purchased the consumer hard good under the at least one condition; and
    in response to determining that the potential buyer did not purchase the consumer hard good under the at least one condition, applying a penalty to an account of the potential buyer.

12. The method of claim 11, wherein the at least one condition comprises a particular time period; and
    wherein determining whether the potential buyer purchased the consumer hard good under the at least one condition comprises determining whether the potential buyer purchased the consumer hard good within the particular time period.

13. The method of claim 11, wherein the penalty applied is dependent on the reward.

14. An apparatus for identifying potential buyers, the apparatus comprising:
    a communications interface configured to receive intent data from a potential buyer, wherein the intent data identifies a consumer hard good or a store service the potential buyer intends to purchase at a future time under at least one condition;
    a processor in communication with the communications interface, the processor configured to:
      determine a reward for the potential buyer in response to receiving the intent data;
      offer the reward to the potential buyer in exchange for the potential buyer providing the intent data;
      determine whether the potential buyer purchased the consumer hard good or the store service under the at least one condition; and
      in response to determining that the potential buyer did not purchase the consumer hard good or the store service under the at least one condition, apply a penalty to an account of the potential buyer.

15. The apparatus of claim 14, wherein the at least one condition comprises a particular time period; and
    wherein the processor is configured to determine whether the potential buyer purchased the consumer hard good or the store service under the at least one condition by determining whether the potential buyer purchased the consumer hard good or the store service within the particular time period.

16. The apparatus of claim 14, wherein the processor is further configured to determine the penalty dependent on the reward.

17. The apparatus of claim 14, wherein the intent data identifies the consumer hard good the potential buyer intends to purchase; and
    wherein the processor is configured to determine whether the potential buyer purchased the consumer hard good or the store service under the at least one condition comprises determining whether the potential buyer purchased the consumer hard good.

* * * * *